E. W. THOMAS.
WHEEL FOR ROAD VEHICLES.
APPLICATION FILED FEB. 24, 1912.
1,139,924.
Patented May 18, 1915.
2 SHEETS—SHEET 1.
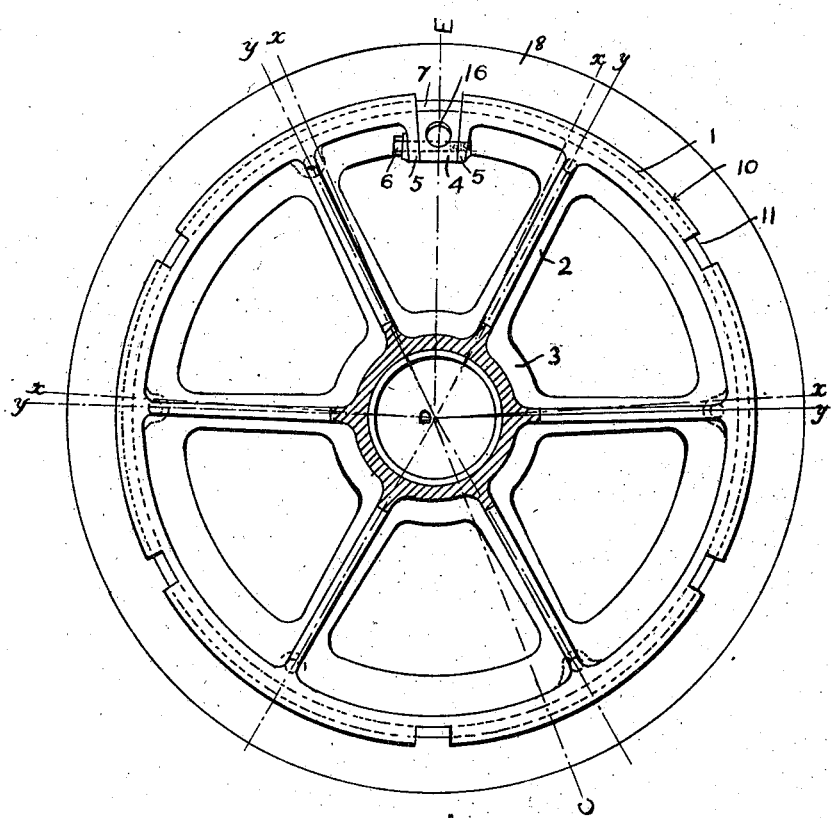
FIG. 1.
FIG. 2.
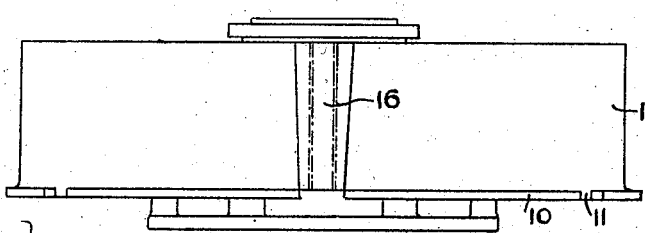

E. W. THOMAS.
WHEEL FOR ROAD VEHICLES.
APPLICATION FILED FEB. 24, 1912.
1,139,924.
Patented May 18, 1915.
2 SHEETS—SHEET 2.
FIG. 3
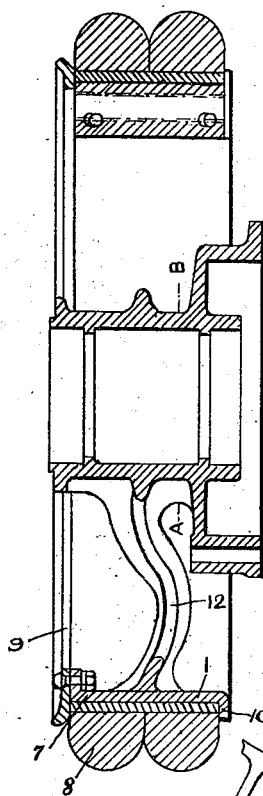
FIG. 4
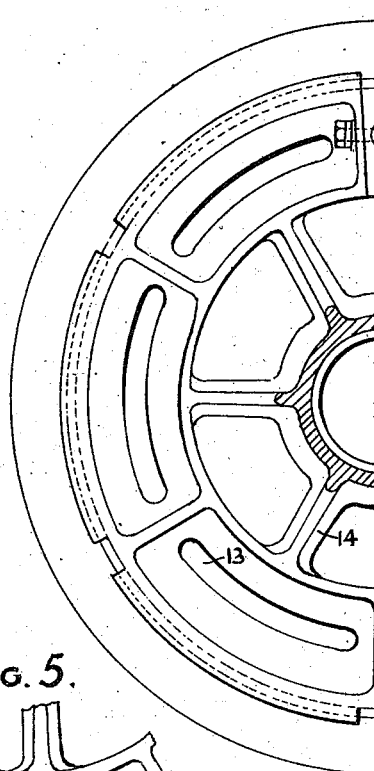
FIG. 5.
FIG. 6.
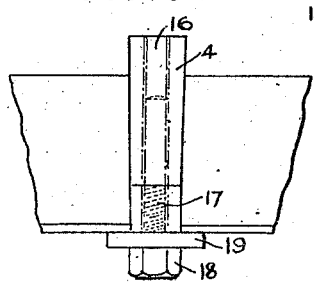
FIG. 7.
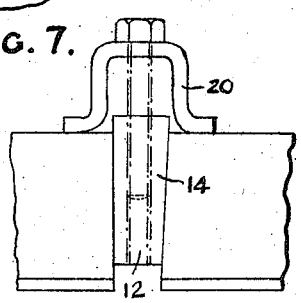
Witnesses
Inventor
Edward W. Thomas
by B. Singer
Atty

UNITED STATES PATENT OFFICE.

EDWARD WILLIAM THOMAS, OF LUTON, ENGLAND.

WHEEL FOR ROAD-VEHICLES.

1,139,924.      Specification of Letters Patent.      Patented May 18, 1915.

Application filed February 24, 1912. Serial No. 679,692.

*To all whom it may concern:*

Be it known that I, EDWARD WILLIAM THOMAS, of 48 Chatsworth road, Luton, in the county of Bedford, England, engineer's draftsman, have invented a certain new and useful Improvement in and Pertaining to Wheels for Road-Vehicles, of which the following is a specification.

This invention relates to vehicle wheels of the kind in which the continuity of the rim or felly is interrupted by a gap, so that the two ends of the rim or the like so formed can be caused to approach or recede from one another and thus produce a variation in the periphery of the rim; which is utilized to enable an external tire-carrying rim to be removed or applied.

The present invention comprises such a dividend rim having one or more gaps, and its principal characteristic is the employment of spokes which are integral with the rim and the hub, and which, while approximating to the rigid type, nevertheless possess a degree of resiliency sufficient to permit of the deformation necessary for the contraction of the rim, when it is desired to remove or apply an external rim carrying the tire. This resiliency is employed, according to my invention, either to cause the rim to tend to expand, or alternatively to tend to contract; in the former case force has to be used to contract the divided rim when required, and in the latter, to expand the said rim and so cause it to engage closely with the outer rim.

It is in the construction of the wheel to produce one or other of the above actions, that the invention principally consists.

The invention in its preferred form is applied to cast steel wheels.

In further describing my invention reference will herein be made to the accompanying drawings illustrative of the same and to the reference numerals thereon.

In these drawings Figure 1 is a side view (the central part only being shown in section) of a cast steel wheel made according to one form of my present invention, and Fig. 2 is a plan of Fig. 1 with the tire removed. Fig. 3 is a section on C D E of Fig. 1. Fig. 4 is an elevation of half a wheel according to a modification of my invention. Fig. 5 shows this modification with the addition of a detail. Figs. 6 and 7 show a convenient method and means for inserting and withdrawing the wedge or insertion block as hereinafter explained.

I propose to manufacture a one piece wheel with a gap in its circumference or rim 1. The spokes 2 are integral with the wheel rim 1 and the hub 3. The gap is occupied by an insertion block 4, when the wheel is in running order, such block supplying the missing portion of the circumference. The ends of the wheel rim 1, which butt against the sides of the block 4, are flanged inwardly toward the wheel center as shown by 5, and these flanges are bored and threaded to receive screwed bolts 6, 6 (or one alone might suffice) or equivalent means whereby the ends of the wheel rim may be clamped against said block. The sides of the block 4, and the ends of the wheel rim are conveniently tapered in a direction which will faciltate the insertion of the block laterally and allow for the distance between the ends of the wheel rim to be varied according to the extent to which the block is inserted. The end flanges 5, 5 aforesaid are also radially inclined toward each other and the block 4 is wedge or keystone-shaped to correspond. Upon the rim 1 lies the steel band 7 carrying the tire 8 permanently fixed thereon.

The object of the gap in the wheel rim 1 is to enable the ends to approach toward one another when the block 4 is removed and thereby contract the peripheral measurement of the wheel rim. This will render the steel band 7 of the tire a loose fit and enable it to be readily removed or applied. This will be done at the exterior side of the wheel as a rule, which is usually fitted with a detachable protective flange 9 (Fig. 3). This flange when removed leaves the bed of the wheel rim 1 flush with the external edge, and the opposite or internal edge of the wheel rim commonly has a small upstanding flange 10 permanently upon it. The flange 9 may have a projecting surface opposite the position of the block 4 for preventing the latter from sliding out. The flange 10 is conveniently cut down in one or more places 11, 11 (Figs. 1 and 2) to the level of the bed or below same, so that a tool may be forced underneath the band 7 or a lateral blow given to the same if it should have firmly adhered to the wheel rim.

Means may be provided as shown in Figs. 6 and 7 for driving or forcing the block 4 into position or for removing or adjusting the same. For this purpose, the block has a threaded transverse hole 16 in it for receiving the threaded part of a bolt 17, the head 18 of which can be turned by a ratchet spanner or any such device. A loose washer 19 may be added when driving the block in as in Fig. 6, and a bridge-piece 20 is advisable for assisting in with-drawing the block, as seen in Fig. 7. Any other alternative device might be used for actuating the wedge-shaped block 4.

It is manifest that the wheel rim cannot contract without deformation of the spokes 2. It will be found that they can bend sufficiently when made of cast steel, a movement of one sixteenth of an inch or so in each being probably enough for the release of the band 7. For practical purposes they are rigid.

As shown in Fig. 1 the spokes are not truly radial when unexpanded, but lie along the lines $x, x$; consequently upon expansion of the rim by means of the wedge block 4 above described, they increase in effective length in a radial direction as indicated by the lines $y\ y$, without becoming stretched.

Furthermore, as shown by 12 in Fig. 3, they themselves have a slight S curvature or any other permanent curvature of appropriate kind, which is adapted to provide sufficient compensation for the circumferential variation of the rim.

In Fig. 4 is shown a modification, according to which a conveniently long hollow space 13 is left in the wheel rim at the point where each spoke 14 joins it, so that some resilience may be afforded for temporary purposes in the adjacent metal on either side of the head of the spoke. Should considerable resiliency be desired, I can provide for this, and yet preserve the rigidity of the wheel by supplying slightly tapered blocks 15, 15, for forcing into the gaps 13, as shown by Fig. 5.

The cast-wheel can be formed by more than one method, and devised as already mentioned either so that its rim will tend naturally to assume its expanded condition, or so that it will tend to contract; the former depends on the casting of the wheels to a slightly larger diameter than that of the external rim within which it is destined to fit, after the gap has been formed; the difference is slight, but nevertheless the spokes may be cast slightly out of the radial line, so that the axes may assume their radial position 8, when fitted within the external rim; the other way depends on casting the wheel to a slightly smaller diameter, and expanding it, when the gap is cut, by means of a wedge block, to the requisite degree; in this case the spokes may be cast slightly out of alinement as in the former instance. It will be obvious that in the former instance, the ends of the divided rim will require to be drawn together by force, in order to remove the external rim; and the screwed bolts 6, 6 may advantageously be utilized for such purposes after the insertion block has been withdrawn of course. Convenient methods of forming the wheels, when the spokes are not cast quite radially will now be detailed. The rim of the casting may be cut through and a wedge or block forced into the gap so as to make the spokes more nearly radial, and the wheels trued up again. These screwed bolts might possibly be employed for expanding the wheel when of light construction. Cramps or other devices might be used instead of bolts. Where the rim normally tends to assume a contracted form upon withdrawal of the block 4, it will in some cases be possible to dispense with the flanges 5 and bolt 6, the inherent forces in the wheel sufficing to contract the rim and loosen the band 7. The internal stresses set up by the presence of the wedge will cause the rim to contract as soon as the wedge is withdrawn. In an alternative but similar method, the rim may be first made a loose fit for the tire (by turning in the lathe) and a gap cut therein to receive the wedge for the purpose of expanding it. The rim could, however, be made large enough in the first instance, if preferred, and the gap made in it, so that as already explained, it could be forcibly contracted. To insure bending with true circularity, the rim is conveniently made thickest at that part remotest from the gap (as clearly seen in Fig. 1) and of less substance in the neighborhood of said gap.

In all forms of my improved wheel, the construction is reduced to extreme simplicity. The loosening of the rim is, in most of the forms described, automatic when the block is withdrawn, breaking away the rust which would otherwise bind the tires, thus facilitating dismounting of the tires, and obviating the use of special tools.

I claim:—

1. A road vehicle wheel comprising a discontinuous rim whose diameter can be varied, and whose greatest thickness is at that part remotest from the gap which breaks its continuity, a hub, spokes integral with the hub and the rim, and means for causing said rim to expand or contract, said spokes yielding sufficiently to permit of the necessary change in confirmation of the rim.

2. A road vehicle wheel comprising a discontinuous rim whose diameter can be varied, and which has hollow spaces adjacent to its junction with the spokes in order to facilitate the contraction or expansion of the rim, a hub and spokes integral with the hub and the rim and capable of yielding sufficiently to permit of the change in conformation of the latter.

3. A road vehicle wheel comprising a discontinuous rim whose diameter can be varied and whose greatest thickness is at that part remotest from the gap which breaks its continuity, a hub, spokes integral with both the hub and the rim, said spokes being so proportioned that they normally tend to remain in a somewhat bent position but will tend to straighten under the forcible expansion of the rim, and means for causing said rim to expand, said spokes yielding sufficiently to permit of the necessary change in conformation of the rim.

4. A road vehicle wheel comprising a discontinuous rim whose diameter can be varied and whose greatest thickness is at that part remotest from the gap which breaks its continuity, a hub, spokes integral with both the hub and the rim, said spokes having an S curvature and tending normally to remain in a bent position, but being adapted to yield under the forcible expansion of the rim, and means for causing said rim to expand, said spokes yielding sufficiently to permit of the necessary change in conformation of the rim.

EDWARD WILLIAM THOMAS.

Witnesses:
H. D. JAMESON,
JOHN PAUL BLACK.